United States Patent
Adamski et al.

(10) Patent No.: US 10,100,263 B2
(45) Date of Patent: Oct. 16, 2018

(54) SYSTEMS AND PROCESSES FOR SEPARATING EMULSIFIED WATER FROM A FLUID STREAM

(71) Applicant: SHELL OIL COMPANY, Houston, TX (US)

(72) Inventors: Robert Paul Adamski, Missouri City, TX (US); Gregory Kent Bethke, Houston, TX (US); Gautan Chandrakanth Kini, Houston, TX (US); Santhosh Kumar Shankar, Houston, TX (US)

(73) Assignee: SHELL OIL COMPANY, Houston, TX (US)

( * ) Notice: Subject to any disclaimer, the term of this patent is extended or adjusted under 35 U.S.C. 154(b) by 213 days.

(21) Appl. No.: 14/874,501

(22) Filed: Oct. 5, 2015

(65) Prior Publication Data
US 2016/0097005 A1    Apr. 7, 2016

Related U.S. Application Data

(60) Provisional application No. 62/060,239, filed on Oct. 6, 2014.

(51) Int. Cl.
| | | |
|---|---|---|
| *C10G 33/02* | (2006.01) | |
| *B01D 17/06* | (2006.01) | |
| *C10G 33/06* | (2006.01) | |
| *C10G 33/04* | (2006.01) | |
| *C10G 31/08* | (2006.01) | |

(Continued)

(52) U.S. Cl.
CPC ......... *C10G 33/02* (2013.01); *B01D 17/0217* (2013.01); *B01D 17/06* (2013.01); *B03C 11/00* (2013.01); *C10G 31/08* (2013.01); *C10G 31/10* (2013.01); *C10G 32/02* (2013.01);
(Continued)

(58) Field of Classification Search
CPC ..... C10G 33/02; B01D 17/0217; B01D 17/06
See application file for complete search history.

(56) References Cited

U.S. PATENT DOCUMENTS

| | | | |
|---|---|---|---|
| 5,352,343 A | 10/1994 | Bailes et al. | |
| 5,575,896 A * | 11/1996 | Sams ................ | B01D 17/0217 204/563 |

(Continued)

OTHER PUBLICATIONS

International Search Report dated Dec. 21, 2015; 5 pages.

*Primary Examiner* — Bryan D. Ripa
(74) *Attorney, Agent, or Firm* — Charles W. Stewart

(57) ABSTRACT

Decreasing the water content of an organic phase can often be desirable, but low water levels can be difficult to achieve at high fluxes when the water is present in an emulsified form, such as in a water-in-oil emulsion. Processes for de-emulsifying a fluid stream containing emulsified water, such as water-in-crude oil emulsions, include introduction of the fluid stream into a vessel that defines a coalescence zone. The vessel is configured to provide for simultaneous application of a centrifugal force and an electric field to the fluid stream within the coalescence zone. The simultaneous application of the centrifugal force and the electric field to the fluid stream provides for the coalescence of a portion of the emulsified water into a bulk aqueous phase. A biphasic mixture comprising continuous phases of the organic component and the bulk aqueous phase is formed within the coalescence zone and subsequently removed from the vessel.

10 Claims, 2 Drawing Sheets

(51) Int. Cl.
*C10G 31/10* (2006.01)
*C10G 32/02* (2006.01)
*B01D 17/02* (2006.01)
*B03C 11/00* (2006.01)

(52) U.S. Cl.
CPC ............ *C10G 33/04* (2013.01); *C10G 33/06* (2013.01); *B03C 2201/02* (2013.01)

(56) References Cited

U.S. PATENT DOCUMENTS

| | | |
|---|---|---|
| 5,647,981 A | 7/1997 | Prevost et al. |
| 5,714,048 A * | 2/1998 | Edmondson ....... B01D 17/0217 204/563 |
| 6,136,174 A | 10/2000 | Berry et al. |
| 8,591,714 B2 | 11/2013 | Sams et al. |
| 2012/0024758 A1 | 2/2012 | Love |

* cited by examiner

SYSTEMS AND PROCESSES FOR SEPARATING EMULSIFIED WATER FROM A FLUID STREAM

The present non-provisional application claims the benefit of U.S. Provisional Patent Application Ser. No. 62/060,239, filed Oct. 6, 2014, the entire disclosure of which is hereby incorporated by reference.

FIELD OF THE INVENTION

The invention relates to a system and process for reducing the water content of water-in-organic emulsions, and, more specifically, to a system and process for conducting high-flux separation of emulsified water from an organic component, such as a water-in-oil emulsion.

BACKGROUND OF THE INVENTION

Many liquid-liquid separation processes involve the separation of water from an organic phase. In such liquid-liquid separation processes, the formation of an aqueous phase that is immiscible with the organic phase allows for separation of the two phases to take place from one another by a variety of means. In particular, the immiscibility of water with the organic phase promotes partitioning between the aqueous phase and the organic phase.

The separation of water from an organic phase can be much more complicated when the water is present in an emulsified form within the organic phase, particularly when processing a water-in-oil emulsion. In such an emulsion, normal gravitational separation of the two phases does not occur by partitioning, or the partitioning process is so slow that it is operationally limiting.

One way to promote breaking of emulsions so that partitioning occurs more readily is through adding various emulsion-breaking substances, such as surfactants, pH modifiers, salts and the like, to the emulsion. Using these substances, however, increases the cost of processing the emulsion and impacts downstream operations. For example, using a surfactant to break water-in-oil emulsions may require removal of the surfactant from the organic phase before the organic phase is further processed. In another example, the use of a pH modifier to break a water-in-oil emulsion can also require further modifying the pH of the separated aqueous phase so that it may be suitably disposed of or further processed.

It is also costly to break emulsions using heat. Heating approaches are prohibitively expensive for many applications in which large fluid volumes are processed.

Other techniques for breaking emulsions include applying a centrifugal force to the emulsion. The application of centrifugal force to an emulsion results in coalescence of the small water droplets in the emulsion until the coalesced droplets increase sufficiently in size to form a bulk aqueous phase, also referred to as a continuous aqueous phase. Because of water's high mobility, it proceeds readily to the outer walls of a vessel in which a centrifugal force is being applied, while a water-depleted and less mobile organic phase remains more toward the longitudinal center of the vessel. This allows for a location-based separation of the two phases to take place.

The application of an electric field to an emulsion also promotes the coalescence of small water droplets into larger water droplets that more readily form a bulk aqueous phase. U.S. Pat. Nos. 6,136,174 and 8,591,714 describe processes and equipment for separating emulsions through application of an electric field to the emulsion. The dewatering processes disclosed in these patents, however, are limited in the extent of dewatering that they provide.

Many applications and processes can benefit from utilizing organic phases having lower water contents than presently available high-flux dewatering techniques provide. Lower flux and more costly dewatering techniques are typically required when an organic phase having a particularly low water content is needed for a specific application or process.

SUMMARY OF THE INVENTION

Accordingly, provided is a process for separating the components of a water-in-oil emulsion from one another. The process comprises: introducing a fluid stream comprising an organic component and emulsified water to a vessel defining a coalescence zone. The vessel is configured to simultaneously apply a centrifugal force and an electric field to the fluid stream within the coalescence zone. The centrifugal force and the electric field are simultaneously applied to the fluid stream within the coalescence zone so as to coalesce a portion of the emulsified water into a bulk aqueous phase. A biphasic mixture comprising continuous phases of the organic component and the bulk aqueous phase is then removed from the coalescence zone of the vessel.

Further provided is a system for separating the components of a water-in-oil emulsion from one another. The system comprises: a vessel having a fluid inlet and an underside fluid outlet. The vessel defines a coalescence zone and is configured to apply a centrifugal force to a fluid stream in the coalescence zone. An electrically insulated electrode having an elongated body is located within the vessel. The electrically insulated electrode is configured to simultaneously apply an electric field to a fluid stream in the presence of the centrifugal force. The underside fluid outlet is configured to remove at least one component of the fluid stream from an underside of the vessel after the centrifugal force and the electric field have been applied to the fluid stream. The vessel has a longitudinal axis and is inclined with respect to the earth's surface. The longitudinal axis makes an incident angle with the earth's surface ranging between 20 degrees and 60 degrees.

DETAILED DESCRIPTION OF THE INVENTION

Figure 2:
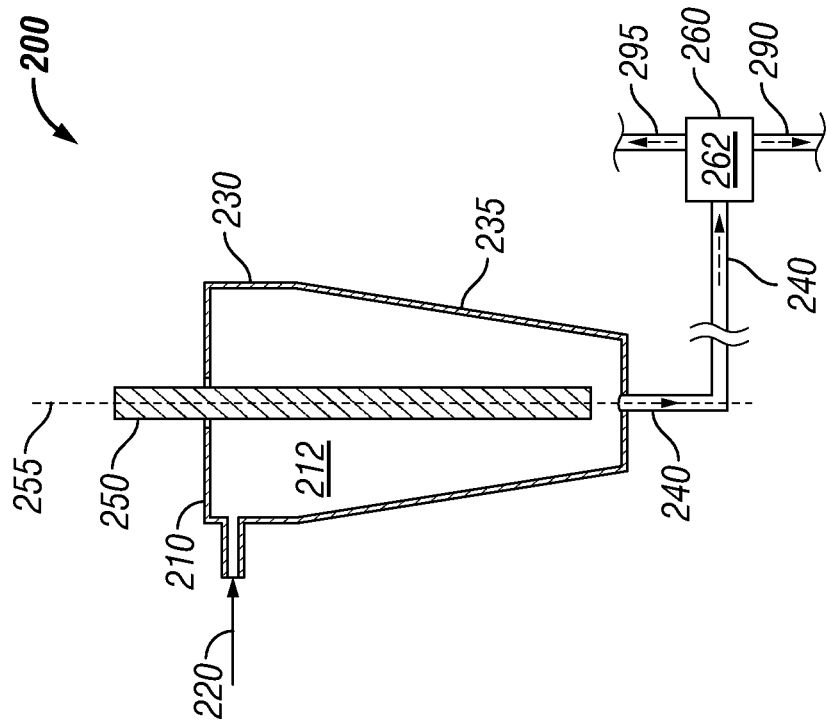
FIGS. 2-4 are schematics of a vessel configured for the simultaneous application of an electric field and a centrifugal force to an emulsified fluid stream.

The present invention is related to systems and processes for conducting high-flux separation of emulsified water contained in an organic component, including the high-flux separation of water from water-in-oil emulsions.

Electrostatic-based or centrifugal force-based separation processes are often used independently in high-flux processes (defined in terms of bbl/day/ft2 or similar units) for removing water from water-in-oil emulsions having a high water content in the range, for example, of from 30 vol. % to 80 vol. % water. With these processes, the final water content of the recovered organic phase is typically lowered to within a range of from 1 vol. % to 10 vol. %. A flux rate is considered to be high when it is in the range of from 1,000 to 4,000 bbl/day/ft2. Further dewatering of the emulsion to a concentration below 1 vol. %; however, is much more difficult to achieve by using these and other existing techniques, even with iterative processing.

When processing an organic component having a low content of emulsified water, the water droplets in the emulsion are too far apart from one another to undergo ready coalescence under the influence of either an electrostatic-based process or a centrifugal force-based process. Because of this deficiency, techniques used to achieve further dewatering of water-in-oil emulsions having a low water content typically require operation at a much lower flux rate, such as a flux rate in the range of less than 150 bbl/day/ft2, or less than 100 bbl/day/ft2.

As indicated above, techniques for promoting separation of an aqueous phase from a water-in-oil emulsion (e.g., an organic emulsion comprising a continuous organic phase and a discontinuous aqueous phase) having a high initial water content are generally limited in the extent of dewatering that they can provide at a high flux rate. Similarly, these separation techniques are much less effective when the initial water content of the emulsion is low, such as less than 10 vol. % water, particularly when the water content is in the range from 1 vol. % to 10 vol. %. As a result, even when cycling an emulsified water-in-oil fluid stream through multiple high-flux dewatering operations, it is difficult to reduce the water content of the emulsion to the less than 1 vol. % required for some applications. Because high-flux dewatering processes are typically unable to provide a dewatered organic phase having a desired low water content, more costly lower flux dewatering techniques are required to provide the dewatered organic phase.

To address the ongoing need for separation of water from an emulsified fluid stream, particularly a water-in-oil emulsion, the present inventors discovered that various synergistic combinations of emulsion coalescence techniques are more effective in promoting the formation of a bulk aqueous phase from emulsified water droplets than the application of any of the techniques individually. The described techniques and systems of the present disclosure provide for the processing of a water-in-oil emulsion under a high flux rate to yield a dewatered organic component having a very low water content.

As used herein, the terms "emulsified water," "emulsified water droplets" and related variants thereof refer to a fine dispersion of water droplets suspended in a continuous organic phase, such as a hydrocarbon or hydrocarbon mixture, wherein the water droplets do not separate from the organic phase or do so only very slowly over time.

As used herein, the term "bulk aqueous phase" refers to a continuous phase comprising water.

The inventive systems and processes simultaneously apply both a centrifugal force and an electric field to a fluid stream comprising emulsified water within an organic component. In particular, the fluid stream comprises a water-in-oil emulsion, such as emulsified water in a continuous hydrocarbon phase. The simultaneous application of the forces within a vessel promotes coalescence of the emulsified water into a bulk aqueous phase within the vessel's coalescence zone. The resulting biphasic mixture, comprising continuous phases of a bulk aqueous phase and an organic phase, subsequently undergoes a separation step to yield separate organic and aqueous components from the emulsion.

The simultaneous application of a centrifugal force and an electric field makes the inventive systems and processes particularly useful in separating, under higher flux rates than are conventionally feasible, emulsified water from emulsified fluid streams having low initial water contents. Thus, the inventive systems and processes allow for de-emulsification of inadequately dewatered emulsified fluid streams, such as water-in-oil emulsions having a low water content, at high flux rates to produce a dewatered organic component. It should also be recognized that these systems and processes can be used for dewatering emulsified fluid streams having high initial water contents as well, such as emulsified fluid streams containing more than 20 vol. % water. In either case, the systems and processes are configured for producing at high flux rates an organic component having a low emulsified water content from an emulsified fluid stream. This feature advantageously facilitates various subsequent high-volume applications that benefit from a low-water content organic component, such as petroleum refining.

Substantially vertical vessel orientations are usually used in conventional separator designs in order to minimize their lateral footprint. Lateral footprint minimization is usually desirable in plant settings where physical space is at a premium. The inventors have further discovered that the inventive systems and processes benefit from having a non-vertical disposition of a vessel in which the centrifugal force and the electric field are applied to the emulsified fluid stream.

As used herein, the terms "non-vertical" or "inclined" refer to the deviation of the longitudinal axis of an elongated vessel from a 90° incident angle with a plane parallel to the earth's surface.

Despite the usual desirability of a substantially vertical vessel orientation, the benefits of a deviation from verticality can supersede the benefits of lateral footprint minimization. Specifically, the inventors recognized that having a non-vertical or inclined surface within the vessel better promotes coalescence of emulsified water droplets into a bulk aqueous phase and lowers the time required to separate the organic component from the bulk aqueous phase. The benefits of a deviation from verticality are particularly realized in combination with application of a simultaneously acting electric field and centrifugal force.

The inventors believe that using an inclined vessel instead of a vertical vessel to define the coalescence zone into which an emulsion is introduced enhances the coalescence rate of water droplets within the coalescence zone. This is thought to be due to the inclined vessel providing for a shorter settling distance of the water droplets before they strike the inside wall of the inclined vessel. In addition, inclination also provides a larger inside wall contact area.

Moreover, the use of an inclined vessel increases the interfacial contact area between two immiscible phases and promotes better phase separation once de-emulsification has taken place, as compared with the use of a vertical vessel. A vertical vessel configuration minimizes both the contact area at the vessel wall and the interfacial contact area.

The inventors also identified alternative configurations in which the vessel itself is vertically oriented but has an inclined surface feature present within its coalescence zone. For example, an electrode providing the electric field within the vessel can be oriented at an angle with respect to the longitudinal axis of the vessel in order to provide an inclined surface within the vessel. Inclined features within a substantially vertical vessel configuration produce similar benefits to those provided by an inclined vessel.

Another advantageous feature of the invention is that, upon formation of a biphasic mixture from an emulsified fluid stream, the biphasic mixture undergoes a separation step that is discrete from the formation of the biphasic mixture. This discrete separation step provides for separating the two continuous phases of the biphasic mixture to yield a bulk aqueous phase and a dewatered organic phase. Specifically, the biphasic mixture, comprising a continuous aqueous phase and a continuous organic phase, separately undergoes a gravitational separation or any other suitable phase separation process after de-emulsification occurs in the coalescence zone of the vessel (i.e., downstream of the vessel in which the centrifugal force and the electric field are applied).

The independent separation of the biphasic mixture greatly simplifies both design and operational considerations of the equipment for carrying out the inventive process. Accordingly, the systems and processes provide for removing a biphasic mixture from the coalescence zone of the vessel but without attempting to further separate the continuous phases of the biphasic mixture from one another within the vessel. Any suitable means or method known to those skilled in the art can be used for separating the biphasic mixture into the continuous aqueous phase and the continuous organic phase.

Although the systems and processes can advantageously provide for separating emulsified water from crude oil or other hydrocarbon resources under high-flux conditions, they are also applicable to separating emulsified water contained within an organic component that comprises hydrocarbons found in various crude oil cuts. Examples of crude oil cuts that can be processed according to the invention include gasoline, diesel, kerosene, fuel oil, light vacuum gas oil, heavy vacuum gas oil, and any other mixture of hydrocarbon compounds.

In the co-production of water and oil from oil-bearing formations, the presence of water in the oil, particularly as emulsified water, generally requires separation to provide a crude oil component suitable for further processing in refinery operations. The generation of oil having a water content that is as low as possible is advantageous in further refining of the oil. Residual water in oil can be exceedingly detrimental to the refinery equipment. Moreover, contaminants carried by the residual water can also be detrimental to the refinery equipment by causing corrosion and scaling, and the contaminants can detrimentally affect the quality of products formed from the refined organic component.

Since the systems and processes of the invention provide for high-flux de-emulsification of water-in-oil emulsions to form a biphasic mixture, they are particularly suitable for coupling to a continuous or semi-continuous refining process. Particularly, these systems and processes can facilitate refining processes by providing a low-water containing crude oil feed while also offering improved product quality and protecting the refinery equipment from fouling by contaminants. In addition, they can operate at high flux rates while still providing extensive dewatering of an organic feed. For example, the inventive systems and processes provide for a dewatered organic stream having a water content less than 1 vol. % when processing the water-in-oil emulsion at a high flux rate of at least 1,000 bbl/day/ft2.

The inventive systems and processes will now be described with reference to the drawings.

Figure 1:
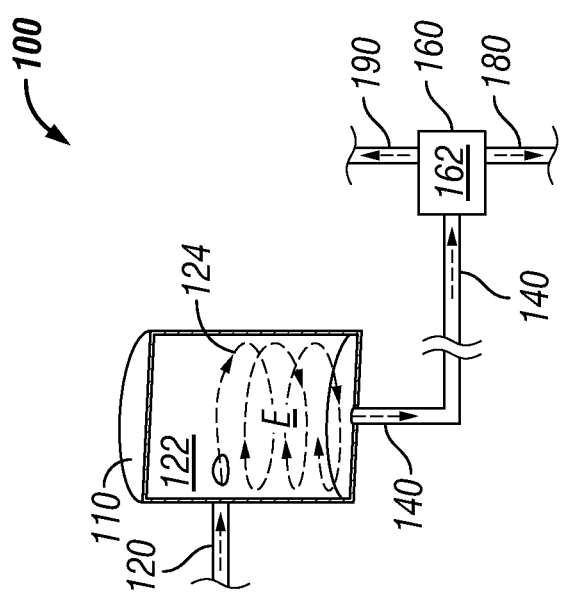
FIG. 1 is a schematic illustrating a system configured for separating water from an emulsified fluid stream.

FIG. 1 shows a general schematic of system 100 configured for separating emulsified water from an emulsified fluid stream. As depicted in FIG. 1, an emulsified fluid stream enters vessel or hydrocyclone 110 of system 100 via fluid inlet line 120. Hydrocyclone 110 defines coalescence zone 122 and provides means for inducing rotational motion within the emulsified fluid stream introduced into coalescence zone 122. This promotes the separation of the heavy (water) and light (oil) components of the introduced emulsified fluid stream by applying a centrifugal force.

Hydrocyclone 110 is configured to provide means for providing the simultaneous application of a centrifugal force and an electric field to the emulsified fluid stream while it is within coalescence zone 122. Hydrocyclone 110 can have either a cylindrical or conical design or any other design that suitably provides for coalescence of water droplets contained in the water-in-oil emulsion. The FIGS. and description below further describe particularly suitable configurations for hydrocyclone 110 and structures for producing an electric field E within hydrocyclone 110.

Within coalescence zone 122, the emulsified fluid stream undergoes separation into a biphasic mixture comprising an organic component, such as crude oil or a component of crude oil, and a bulk aqueous phase, both of which progress toward the bottom of hydrocyclone 110 under the influence of gravity. Upon reaching the bottom of hydrocyclone 110, the biphasic mixture exits hydrocyclone 110 by way of underside fluid outlet line 140. The organic component and the bulk aqueous phase can exit hydrocyclone 110 at the same time, or they can exit separately from one another at different times in a random fashion. Removing the biphasic mixture from hydrocyclone 110 at a single location desirably avoids having to separate the components of the biphasic mixture within hydrocyclone 110.

The biphasic mixture removed from hydrocyclone 110 is then conveyed to separator 160, also referred to as a separation apparatus, which is fluidly coupled to hydrocyclone 110 via underside fluid outlet line 140. Separator 160 defines separation zone 162 and provides means for separating the biphasic mixture to yield a separate organic component and a separate bulk aqueous phase. The removal of the bulk aqueous phase from separation zone 162 via outlet line 180 and the organic component via outlet line 190 provides for separating the continuous phases of the biphasic mixture from one another.

Separator 160 includes any separation apparatus or means that provides for separating the biphasic mixture into an organic component and a bulk aqueous phase. Separator 160 is not particularly limited in structure or function. A settling tank can suitably be used as separator 160, thereby defining a separation zone 162 that provides for gravitational separation of the biphasic mixture in conjunction with settling of any particulate matter that may be present in the emulsified fluid stream. Other suitable separators 160 include, for example, API separators, parallel plate separators, tilted plate separators, corrugated plate separators, air floatation separators, centrifuges, hydrocyclones, membrane separators, the like, and any combination thereof.

Still other suitable separators 160 include components of the separators described in U.S. Pat. No. 8,591,714, which is incorporated herein by reference. As described in this patent, elongated passageways provide for downward flow of water and upward flow of an organic component, such as oil. A feed to the elongated passageways passes through an elongated inlet vessel containing an electrode. Such separators may operate in a continuous mode or in a semi-batch mode.

Solids can also be removed from the biphasic mixture downstream from hydrocyclone 110. This is performed in conjunction with separation of the continuous phases of the biphasic mixture from one another. In this regard, many separation means and apparatuses described above can effectively promote separation of solids from the aqueous phase or the organic component.

Figure 4:
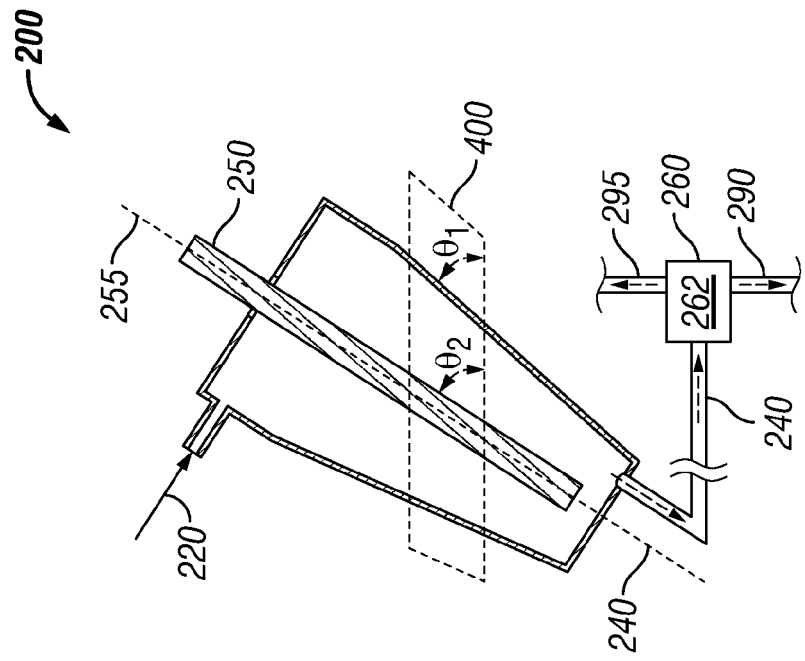
Figure 3:
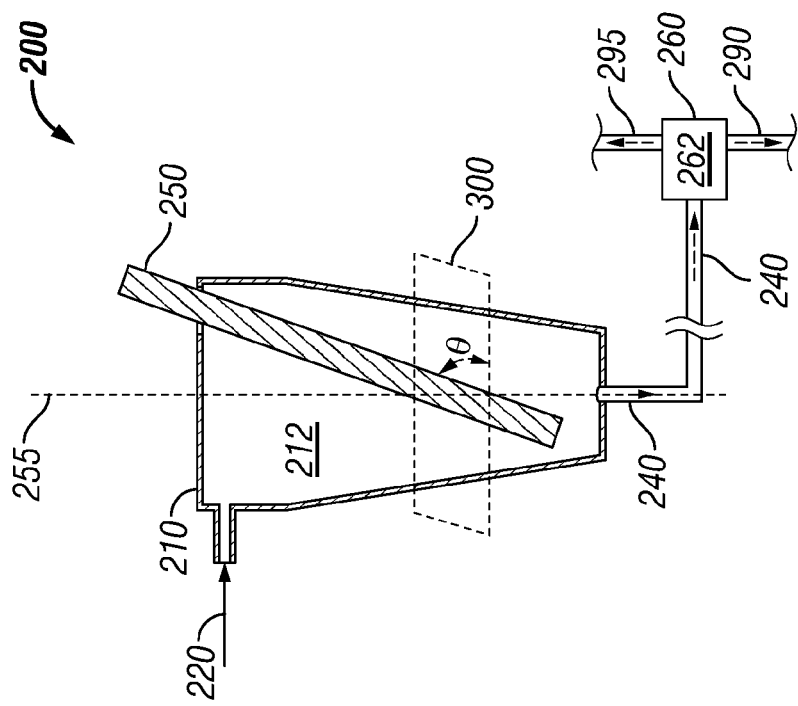

Further description follows, with reference to FIGS. 2-4, of how the invention simultaneously applies an electric field and a centrifugal force to an emulsified fluid stream in a coalescence zone. The discussion first addresses the application of a centrifugal force to an emulsified fluid stream in a vessel.

System 200 of FIG. 2 shows hydrocyclone 210 that defines coalescence zone 212. Hydrocyclone 210 is equipped with fluid inlet line 220 that is fluidly connected to upper portion 230 and provides for tangentially introducing an emulsified fluid into coalescence zone 212. Alternatively, fluid inlet line 220 is fluidly connected to conical section 235 of hydrocyclone 210, again with a tangential connection for promoting rotational motion within coalescence zone 212. The emulsified fluid stream undergoes rotational motion within conical section 235 to produce a biphasic mixture that exits hydrocyclone 210 through underside fluid outlet line 240.

Upon exiting hydrocyclone 210, the biphasic mixture is conveyed to separator 260 that defines separation zone 262 and provides means for separating the biphasic mixture to yield a bulk aqueous phase and a continuous organic phase. The bulk aqueous phase is removed from separation zone 262 through fluid outlet line 290, and the organic phase is removed from separation zone 262 through fluid outlet line 290.

As shown in the FIGS., electrode 250 is disposed within coalescence zone 212. Electrode 250 provides means for conveying an electric field to the emulsified fluid stream introduced into and contained within coalescence zone 212. Electrode 250 conveys the electric field to the emulsified fluid stream while the emulsified fluid stream is experiencing or is subjected to a centrifugal force. Preferably, electrode 250 is elongated and is configured so that it extends along or coincident to longitudinal axis 255. Accordingly, electrode 250 extends through a substantial portion of the longitudinal length of hydrocyclone 210 as depicted in FIGS. 2 and 4.

In FIG. 3, electrode 250 is shown to deviate from longitudinal axis 255, such that electrode 250 is inclined with respect to the earth's surface. Electrode 250 can also be parallel to and laterally offset from longitudinal axis 255. Further, multiple electrodes 250 can be used even though FIGS. 2-4 depict a single electrode 250. Electrode 250 is operatively connected to either an AC or DC power source (not shown).

Electrical insulation can be provided on the exterior of electrode 250. Electrode 250 can be insulated so that it applies an electric field to the emulsified fluid stream without directly applying a current to it. Electrode 250 can also have a substantially linear geometry, such as depicted in FIGS. 2-4. Accordingly, electrode 250 can have a non-concave exterior. The geometry of electrode 250 minimizes channeling of the emulsified fluid stream and its components within coalescence zone 212. Electrode 250 can be either solid or tubular.

The insulation of electrode 250 is any suitable dielectric coating material, including polymers that are typically used for providing electrical insulation. It is preferred for electrode 250 to have a coating of the dielectric coating material when electrode 250 is used in processing an emulsified fluid stream having a high emulsified water content or an emulsified fluid stream having a high conductivity due to the presence of a dissolved salt. When these conditions are not present, electrode 250 may be left uncoated, if desired.

When electrode 250 is uncoated, it directly conveys both an electric current and an electric field to the emulsified fluid stream.

Another feature of system 200 that can provide coalescence and separation benefits is the placement of electrode 250 within coalescence zone 212. Electrode 250 can be parallel to or coincident with longitudinal axis 255. Alternatively, electrode 250 can be oriented or disposed within hydrocyclone 210 at an oblique angle with respect to the earth's surface (or a plane situated parallel to the earth's surface). Accordingly, when hydrocyclone 210 is vertically disposed as depicted in FIGS. 2 and 3, electrode 250 is inclined with respect to the earth's surface.

In the configuration of system 200 shown in FIG. 3, electrode 250 is non-parallel to longitudinal axis 255. Specifically, electrode 250 is disposed at angle θ with respect to plane 300. Plane 300 is parallel to the earth's surface, and angle θ is less than 90 degrees. Preferably, angle θ is in a range from 20 degrees to 60 degrees, or in a range from 22 degrees to 45 degrees.

In addition, both hydrocyclone 210 and electrode 250 can be oriented at an oblique angle with respect to plane 400. FIG. 4 illustrates this geometry. The oblique angle between longitudinal axis 255 and plane 400 is less than 90 degrees with respect to the earth's surface.

As depicted in FIG. 4, hydrocyclone 210 and coalescence zone 212 are disposed at angle θ1 with respect to plane 400 and electrode 250 is disposed at angle θ2 with respect to plane 400. Plane 400 is parallel to the earth's surface. When electrode 250 is disposed coincident with or parallel to longitudinal axis 255, angle θ1 and angle θ2 are equal to one another. However, if electrode 250 is not coincident with or parallel to longitudinal axis 255, angle θ1 and angle θ2 differ.

Particularly, angle θ1 is in a range from 20 degrees to 60 degrees. More preferably, angle θ1 is in a range from 22 degrees to 45 degrees. Still more preferably, angle θ1 is an angle greater than 30 degrees.

Angles θ1 and θ2 are chosen to promote coalescence of emulsified water droplets to a desired degree without requiring an overly large lateral footprint of hydrocyclone 210. As discussed above, configuring hydrocyclone 210, electrode 250, or both into a non-vertical orientation can be particularly beneficial for promoting gravitational coalescence of water droplets at the wall of hydrocyclone 210 or at electrode 250 to form a bulk aqueous phase. This allows for an increase in the flux rate but without reducing the amount of dewatering conveyed to the emulsified fluid stream. Indeed, this configuration even provides for an enhancement in the dewatering of the emulsified fluid stream.

The inventive systems can further include pre-conditioning separation means (not shown) for pre-conditioning the emulsified fluid stream for separation. The pre-conditioning separation means is selected from the group consisting of a mechanical screen, an electrified screen, an electrocoagulator, an electroprecipitator, and any combination thereof.

When a pre-conditioning separation means is used, it is fluidly connected to fluid inlet line 120 of hydrocyclone 110 or to fluid inlet line 220 of hydrocyclone 210. This provides upstream pre-conditioning of the emulsified fluid stream before introducing it into either coalescence zone 122 or coalescence zone 212. Such pre-conditioning of the emulsified fluid stream can further promote the coalescence process within either coalescence zone 122 or coalescence zone 212.

The inventive system, thus, comprises a vessel that defines a coalescence zone and has a fluid inlet for receiving and introducing an emulsified fluid stream into the coalescence zone. The vessel is a hydrocyclone. The hydrocyclone is configured to apply a centrifugal force to the emulsified fluid stream. An insulated, and usually elongated, electrode is positioned within the coalescence zone of the hydrocyclone. The insulated electrode is disposed within the coalescence zone so as to apply an electric field to the emulsified fluid stream in the presence of the centrifugal force. The underside fluid outlet provides for removing a biphasic mixture or a component of the biphasic mixture from the underside of the vessel after applying the centrifugal force and the electric field to the emulsified fluid stream. The hydrocyclone can be inclined with respect to the earth's surface so that its longitudinal axis makes an incident angle with the earth's surface in a range from 20 degrees to 60 degrees, and, preferably, from 22 degrees to 45 degrees.

The inventive system further can comprise a separation apparatus or separation means fluidly connected to the underside fluid outlet. The separation apparatus defines a separation zone and provides means for separating the biphasic mixture into continuous phases of an organic component and a bulk aqueous phase. Suitable separation apparatuses or separation means include those described above. In addition, the separation apparatus can also provide for removing solids that may be present in the biphasic mixture.

The insulated electrode can be placed within the vessel at an oblique angle with respect to the vessel's longitudinal axis. That is, the insulated electrode can deviate from verticality in a substantially vertical vessel configuration and make an oblique angle with the earth's surface. Thus, the insulated electrode makes an incident angle with the earth's surface in a range from 20 degrees to 60 degrees, or from 22 degrees to 45 degrees.

As for the hydrocyclone, its longitudinal axis can also be inclined with respect to the earth's surface, such that it makes an incident angle with the earth's surface in a range of 20 degrees to 60 degrees, or from 22 degrees to 45 degrees. In addition, the insulated electrode is placed or oriented within the coalescence zone of the hydrocyclone parallel to or in any other suitable orientation with respect to the longitudinal axis.

The inventive processes provide for converting an emulsified fluid stream, such as a water-in-oil emulsion, into a biphasic mixture. The biphasic mixture comprises mixed continuous phases of the organic component and bulk aqueous phase that can then be separated. In a preferred process, the emulsified fluid stream is an emulsified crude oil or an emulsified fraction of crude oil.

The inventive process includes introducing an emulsified fluid stream into a coalescence zone defined by a hydrocyclone. The hydrocyclone provides means for simultaneously applying a centrifugal force and an electric field to the emulsified fluid stream within the coalescence zone. This simultaneous application of the centrifugal force and the electric field to the emulsified fluid stream within the coalescence zone provides for coalescence of a portion of the emulsified water into a bulk aqueous phase to provide a biphasic mixture that is then removed from the hydrocyclone.

The components of the biphasic mixture are removed, either together or separately, from the coalescence zone of the hydrocyclone and transferred to a separation apparatus that defines a separation zone and provides means for separating the aqueous phase from the organic phase. Typically, the biphasic mixture is removed from the coalescence zone through an opening or outlet on the underside of the vessel.

The water droplets or particles of the water-in-oil emulsion are of a size in the range of from 10 nm to 100 microns. More typically, however, the water particles have a size in the range of from 25 nm to 10 microns, and, most typically, from 50 nm to 1 micron. Any combination or subrange of these droplet sizes may be present. Water droplet sizes above 100 microns in diameter are considered to be a bulk aqueous phase for purposes of the present disclosure.

The electric field applied in the inventive process can vary in magnitude over a wide range, and the magnitude of the applied field can be varied to achieve a desired degree of coalescence of emulsified water droplets. The applied voltage producing the electric field can be in the range of from 500 volts to 40,000 volts, and, more preferably, in a range of from 15,000 volts to 20,000 volts. The electric field is applied with either an alternating current or a direct current.

The electric field is applied either continuously or it is pulsed. When pulsed, the pulse rate is in a range of from 0.1 Hz to 50 Hz, or from 0.1 Hz to 10 Hz, or from 1 Hz to 5 Hz. Waveforms other than pulsing the applied voltage can be used.

The rate at which the emulsified fluid stream is introduced into the coalescence zone of the vessel is such as to provide a flux rate of at least 1,000 bbl/day/ft2 (bbl=barrel=42 US gallons) while still providing an organic component having a reduced water content below 1 vol. %. The value used for the area term (ft2) of the flux formula is the effective cross-sectional area of the vessel (i.e., of the plane area that is perpendicular to the vertical axis of the vessel) into which the emulsified fluid stream is introduced.

It is desirable for the flux rate of the inventive process to be as high as feasible. Thus, the flux rate can be in a range of at least 1,500 bbl/day/ft2 or at least 2,000 bbl/day/ft2. Due to technical and practical limits of the inventive process, there is a practical upper limit to the flux rate. Therefore, the flux rate can be in the range from 1,000 bbl/day/ft2 to 6,000 bbl/day/ft2, or from 1,500 bbl/day/ft2 to 5,000 bbl/day/ft2, or from 2,000 bbl/day/ft2 to 4,500 bbl/day/ft2, or from 2,500 bbl/day/ft2 to 4,000 bbl/day/ft2, or from 4,000 bbl/day/ft2 to 5,000 bbl/day/ft2. Conventional dewatering operations that are capable of producing a water content below 1 vol. %, in contrast, generally operate at much lower flux rates that are typically less than 100 bbl/day/ft2.

As noted above, the inventive process provides a dewatered organic component of the emulsified fluid stream having a water content below 1 vol. % after separation of the continuous phases of the biphasic mixture. It is preferred for the water content to be below 0.7 vol. % after separation of the biphasic mixture and less than 0.6 vol. % or even less than 0.3 vol. %. It is even more preferred for the water content to be below 0.1 vol. % or below 0.01 vol. % after separation of the biphasic mixture. A practical lower limit for the water content is greater than 10 ppmv or greater than 100 ppmv.

If, after separating the biphasic mixture to yield the organic component and the bulk aqueous phase, the organic component still contains an unacceptably high content of emulsified water, the organic component can then be recycled to the vessel for further dewatering or it can be transferred to another vessel configured similarly to the ones described above.

Thus, multiple vessels configured to apply a centrifugal force and an electric field to an emulsified fluid stream can be operatively connected in a series flow arrangement such that the water content of the organic component is decreased to a desired level. Alternatively, multiple vessels configured to apply a centrifugal force and an electric field to an emulsified fluid stream can be operatively connected in a parallel flow arrangement to improve processing throughput or flux rates. In addition, processing of the emulsified fluid stream can take place in a continuous, semi-continuous, or batch mode.

Not only can the inventive systems be used in series or parallel flow arrangements, but they can also be coupled with conventional separator units and processes. A number of configurations are possible in this regard. Illustrative configurations include: the system connected in a series flow arrangement with a conventional separator unit; the system connected in a parallel flow arrangement with a conventional separator unit in which the conventional separator unit is the primary dewatering unit; or the system connected in a parallel flow arrangement with a conventional separator unit in which the conventional separator unit is a secondary or backup dewatering system.

Although the inventive systems and processes can be used for converting any emulsified fluid stream into a biphasic mixture for subsequent separation, they are particularly applicable to emulsified fluid streams having a relatively low initial content of emulsified water. In the inventive process, the emulsified fluid stream can contain emulsified water in an amount in a range from 0.5 vol. % to less than 10 vol. %, based on the volume of the emulsified fluid stream.

It is especially significant aspect of the inventive process that the emulsified fluid stream contains significantly less emulsified water such as amounts greater than 0.7 vol. % and less than 8 vol. %, or amounts greater than 0.9 vol. % and less than 5 vol. %, or amounts greater than 1.2 vol. % and less than 3 vol. %.

Higher contents of emulsified water, such as between 15 vol. % to 80 vol. % emulsified water can be addressed through conventional systems and processes for de-emulsifying emulsified fluid streams, although emulsified fluid streams having water contents within this range are also suitably addressed with the inventive systems and processes, as well. These emulsified fluid streams can be initially dewatered through a conventional process to provide a partially dewatered fluid stream containing emulsified water in the above-noted amounts or concentrations.

When the emulsified fluid stream comprises both bulk water and emulsified water, it is more desirable to remove the bulk water from the emulsified fluid stream before further processing takes place. Separation of bulk water is readily done by simpler, conventional processing techniques. Accordingly, when an emulsified fluid stream contains a significant amount of bulk water, it can first be processed using conventional methods as described above to lower its water content. The emulsified fluid stream is then passed to the inventive systems for processing by the methods.

The inventive processes can further comprise a step of adding a chemical to the emulsified fluid stream to promote further coalescence of the emulsified water into the bulk aqueous phase. Suitable chemicals include, for example, various polymers, surfactants, salts, de-emulsifiers, acids, and bases. The chemicals can be introduced into the coalescence zone of the vessel, or they can be added or introduced directly into the emulsified fluid stream being introduced into the coalescence zone of the vessel.

The organic component of the emulsified fluid stream is typically a hydrocarbon or mixture of hydrocarbons. The preferred feed of the inventive process is a water-in-crude oil emulsion or a water-in-crude oil fraction emulsion. More specifically, the organic component of the emulsion comprises crude oil or a partially dewatered crude oil. Thus, the emulsified fluid stream can comprise as-obtained crude oil or crude oil that has already been processed in a manner to remove a portion of its water content.

When the emulsified fluid stream comprises crude oil or a partially dewatered crude oil, the emulsified water may comprise formation water, or water that was introduced into a formation in conjunction with treating or producing the formation, or any combination thereof. The emulsified water associated with the crude oil can comprise a salt solution or brine.

Other various components that can be present in the emulsified water, either alone or in combination with a salt, can include chemicals used in the course of treating or producing a formation such as, for example, polymers, breakers, gels, sealants, oxidants, anti-oxidants, amines and the like. Metallic contaminants can also be present in the emulsified water. Similarly, formation components such as salts of naphthenic acids, for example, can be present in the emulsified water.

Decreasing the content of emulsified water in a crude oil improves the quality of the yielded organic component. By practicing the invention, the amount of undesirable substances carried with the emulsified water of a water-in-organic component (e.g., oil) emulsion and eventually transferred to the processed organic component is lessened. Decreased contaminant quantities in the organic component can be beneficial for various processes, particularly refining processes, where salt or other contaminants from residual emulsified water cause issues such as corrosion, precipitation, and fouling.

The invention claimed is:

1. A process comprising:
   introducing a fluid stream comprising an organic component and emulsified water to a vessel defining a coalescence zone, the vessel being configured to simultaneously apply a centrifugal force and an electric field to the fluid stream within the coalescence zone;
   simultaneously applying the centrifugal force and the electric field to the fluid stream within the coalescence zone to coalesce a portion of the emulsified water into a bulk aqueous phase within the coalescence zone; and
   removing from the vessel a biphasic mixture comprising continuous phases of the organic component and the bulk aqueous phase;
   wherein the electric field is applied with an electrically insulated electrode; and
   wherein the vessel has a longitudinal axis and the electrically insulated electrode is non-parallel with respect to the longitudinal axis.

2. The process of claim 1, further comprising: separating the biphasic mixture into the organic component and the bulk aqueous phase.

3. The process of claim 2, wherein the vessel is a hydrocyclone.

4. The process of claim 3, wherein the electrically insulated electrode has an elongated body located within the coalescence zone of the vessel.

5. The process of claim 4, wherein the vessel is inclined with respect to the earth's surface, thereby making an incident angle with the earth's surface in a range from 20 degrees to 60 degrees.

6. The process of claim 5, wherein the organic component comprises a crude oil or a partially dewatered crude oil.

7. The process of claim 6, wherein the fluid stream comprises less than 10 vol. % water.

8. The process of claim 7, wherein the biphasic mixture is removed via an underside fluid outlet on an underside of the vessel.

9. The process of claim 8, wherein the fluid stream is introduced to the vessel after passing through a mechanical screen, an electrified screen, an electrocoagulator, an electroprecipitator, or any combination thereof.

10. The process of claim 9, further comprising:
adding a chemical to the fluid stream to further promote coalescence of the emulsified water into the bulk aqueous phase.

\* \* \* \* \*